US012162618B2

(12) United States Patent
Mengle et al.

(10) Patent No.: US 12,162,618 B2
(45) Date of Patent: Dec. 10, 2024

(54) DISSIMILARLY SHAPED AIRCRAFT NOZZLES WITH TANDEM MIXING DEVICES, AND ASSOCIATED SYSTEMS AND METHODS

(71) Applicant: BOOM TECHNOLOGY, INC., Centennial, CO (US)

(72) Inventors: Vinod G. Mengle, Foothill Ranch, CA (US); Cory Hodgkins, Tyner, KY (US); Vikram Aditya Kumar, Denver, CO (US)

(73) Assignee: Boom Technology, Inc., Centennial, CO (US)

( * ) Notice: Subject to any disclaimer, the term of this patent is extended or adjusted under 35 U.S.C. 154(b) by 0 days.

(21) Appl. No.: 17/962,994

(22) Filed: Oct. 10, 2022

(65) Prior Publication Data

US 2023/0112668 A1    Apr. 13, 2023

Related U.S. Application Data

(60) Provisional application No. 63/254,346, filed on Oct. 11, 2021.

(51) Int. Cl.
*F02K 1/36*    (2006.01)
*F02K 1/34*    (2006.01)
(Continued)

(52) U.S. Cl.
CPC ............... *B64D 33/06* (2013.01); *F02K 1/36* (2013.01); *F02K 1/386* (2013.01); *F02K 1/46* (2013.01); *F05D 2260/81* (2013.01)

(58) Field of Classification Search
CPC .......................................................... F02K 1/36
See application file for complete search history.

(56) References Cited

U.S. PATENT DOCUMENTS 2,940,252 A   6/1960 Reinhart
3,568,792 A   3/1971 Urquhart
(Continued)

FOREIGN PATENT DOCUMENTS

EP    2598737    2/2019

OTHER PUBLICATIONS

Aviation.stackexchange.com, "What is this ring-shaped device behind this DC-8's jet engine?", Sep. 2020, pp. 1-6. (Year: 2020).*
(Continued)

*Primary Examiner* — Todd E Manahan
*Assistant Examiner* — Marc Amar
(74) *Attorney, Agent, or Firm* — Perkins Coie LLP

(57) ABSTRACT

Dissimilarly shaped aircraft nozzles with tandem mixing devices, and associated systems and methods are disclosed. An ejector nozzle in a representative embodiment includes a nozzle duct having a nozzle flow axis, a first axial position and a second axial position. The nozzle duct has a first cross-sectional shape at the first axial position, and a second cross-sectional shape at the second axial position, with the second shape being geometrically non-similar to the first shape. The nozzle further includes a fan flow duct portion and a core flow duct portion, both upstream of the first axial position. An ejector duct is positioned in fluid communication with the nozzle duct, and has at least one portion with a cross-sectional shape geometrically similar to the second cross-sectional shape. A first mixing device is positioned proximate to the first axial position to mix fan flow in the fan flow duct portion with core flow in the core flow duct portion, and a second mixing device is positioned downstream of the first mixing device to mix the fan flow and the core flow with flow through the ejector duct, and direct the combined flow generally along the nozzle flow axis. A representative design technique can include selecting an (Continued)

axial position for, and tailoring the shape of, the second mixing device, such as, their spanwise spacings, to enhance flow characteristics of interest, e.g., identified via computational fluid dynamic techniques, that may appear at (e.g., only at) a downstream position.

12 Claims, 15 Drawing Sheets

(51) Int. Cl.
   *F02K 1/38* (2006.01)
   *F02K 1/46* (2006.01)

(56) References Cited

U.S. PATENT DOCUMENTS

| | | | | |
|---|---|---|---|---|
| 3,685,612 | A * | 8/1972 | Bertin | F02K 1/36 239/265.17 |
| 3,747,855 | A * | 7/1973 | Vdoviak | F02K 1/36 239/265.41 |
| 3,990,530 | A * | 11/1976 | Helfrich | F02K 1/36 239/265.13 |
| 4,052,847 | A | 10/1977 | Rodgers et al. | |
| 4,066,214 | A | 1/1978 | Johnson | |
| 4,117,671 | A | 10/1978 | Neal et al. | |
| 4,189,939 | A * | 2/1980 | West | F01D 21/003 73/118.03 |
| 4,280,587 | A * | 7/1981 | Bhat | F02K 1/40 60/262 |
| 4,291,530 | A * | 9/1981 | Ballard | F02C 7/04 428/116 |
| 4,401,269 | A | 8/1983 | Eiler | |
| 4,502,639 | A * | 3/1985 | Szuminski | F02K 1/36 239/265.41 |
| 4,742,709 | A * | 5/1988 | Angel | F02C 7/00 73/118.03 |
| 5,154,052 | A * | 10/1992 | Giffin, III | F02K 1/62 60/262 |
| 5,761,899 | A | 6/1998 | Klees | |
| 5,761,900 | A | 6/1998 | Presz, Jr. | |
| 5,826,794 | A * | 10/1998 | Rudolph | F02K 1/383 239/265.17 |
| 5,884,471 | A | 3/1999 | Anderson | |
| 5,884,472 | A | 3/1999 | Presz, Jr. et al. | |
| 7,017,332 | B2 * | 3/2006 | Oishi | F02K 1/386 239/265.17 |
| 7,458,221 | B1 | 12/2008 | Arnold et al. | |
| 8,371,124 | B2 | 2/2013 | Chase et al. | |
| 9,995,245 | B2 | 6/2018 | Dindar et al. | |
| 10,724,472 | B1 | 7/2020 | Chase | |
| 2002/0125340 | A1 | 9/2002 | Birch et al. | |
| 2003/0145578 | A1 * | 8/2003 | Oishi | F02K 1/386 60/262 |
| 2004/0006968 | A1 * | 1/2004 | Oishi | F02K 1/386 60/262 |
| 2004/0244357 | A1 | 12/2004 | Sloan | |
| 2006/0059891 | A1 * | 3/2006 | Sheoran | F02K 1/386 60/269 |
| 2007/0028622 | A1 * | 2/2007 | Steyer | F02K 1/825 60/39.5 |
| 2009/0314885 | A1 * | 12/2009 | Leland | B64D 33/06 60/770 |
| 2010/0162679 | A1 | 7/2010 | Khalid | |
| 2011/0126512 | A1 | 6/2011 | Anderson | |
| 2013/0017065 | A1 | 1/2013 | Webster | |
| 2014/0260283 | A1 | 9/2014 | Bouchard et al. | |
| 2015/0013341 | A1 | 1/2015 | Cunningham | |
| 2015/0044030 | A1 | 2/2015 | Forsyth | |
| 2015/0226155 | A1 * | 8/2015 | Klingels | B64D 33/04 239/265.19 |
| 2017/0145955 | A1 | 5/2017 | Baker | |
| 2018/0100468 | A1 | 4/2018 | Sutterfield et al. | |
| 2018/0134382 | A1 | 5/2018 | Scholl et al. | |
| 2019/0301400 | A1 * | 10/2019 | Kothari | F02K 7/18 |
| 2020/0025129 | A1 | 1/2020 | Colebrooke et al. | |
| 2020/0318495 | A1 * | 10/2020 | Kassab | F02K 1/386 |
| 2022/0325678 | A1 | 10/2022 | Mengle et al. | |

OTHER PUBLICATIONS

Hedges, L. and Eberhardt, S., Jan. 1992. Numerical simulation of total temperature separation in jets. In 30th Aerospace Sciences Meeting and Exhibit (p. 535). (Year: 1992).*

Thirumurthy, D., Blaisdell, G., Lyrintzis, A. and Sullivan, J., 2011. Preliminary design and computational analysis of an ejector nozzle with chevrons. In 49th AIAA Aerospace Sciences Meeting including the New Horizons Forum and Aerospace Exposition (p. 918). (Year: 2011).*

Hendricks, E. and Seidel, J., Sep. 2012. A multidisciplinary approach to mixer-ejector analysis and design. In 48th AIAA/ASME/SAE/ASEE Joint Propulsion Conference & Exhibit (p. 4224). (Year: 2012).*

Zaman, K.Q., Bridges, J.E., Castner, R.S. and Fagan, A.F., 2019. An investigation of a mixer-ejector nozzle for jet noise reduction. In 25th AIAA/CEAS Aeroacoustics Conference (p. 2494). (Year: 2019).*

Zaman, K.Q., Castner, R.S., Bridges, J.E., Fagan, A.F. and Upadhyay, P., 2020. Experiments on Thrust, Flowfield and Noise of a Rectangular Mixer-Ejector Nozzle. In AIAA Scitech 2020 Forum (p. 0003). (Year: 2020).*

Cheng-xiong, P., Yong, S. and Jing-zhou, Z., 2014. Parametric effects on internal aerodynamics of lobed mixer-ejector with curved mixing duct. Journal of engineering for gas turbines and power, 136(6), p. 061504. (Year: 2014).*

U.S. Appl. No. 17/955,900, filed Sep. 29, 2022, Mengle et al.

Goodykoontz et al., "Noise Tests of a Mixer Nozzle—Externally Blown Flap System," NASA Technical Note, D-7236, Washington D.C., May 1973, 57 pages.

International Search Report and Written Opinion for International Patent Application No. PCT/US22/46179, Applicant: Boom Technology, Inc., mailed Feb. 14, 2023, 9 pages.

Mengle et al., "Lobed Mixer Design for Noise Suppression—Acoustic and Aerodynamics Test Data Analysis," NASA-CR-2002-210823, vol. 1, EDR No. 18580, Jul. 2002, 297 pages.

O'Reilly, Andrew, "Supersonic planes could make big comeback with quieter, 'low-boom' NASA aircraft," NASA, published Apr. 5, 2018, 5 pages.

Tillman et al., "Enhanced Mixing of Supersonic Jets," J. Propulsion, vol. 7, Nov.-Dec. 1991, 9 pages.

Majjigi et al., "Low Noise Exhaust Nozzle Technology Development," NASA, CR-2005-213325, Feb. 2005, 169 pages.

Balan, C., "Cold Aero Performance of a Two-Dimensional Mixer Ejector Nozzle," NASA, CR-2005-213134, Jan. 2005, 126 pages.

* cited by examiner

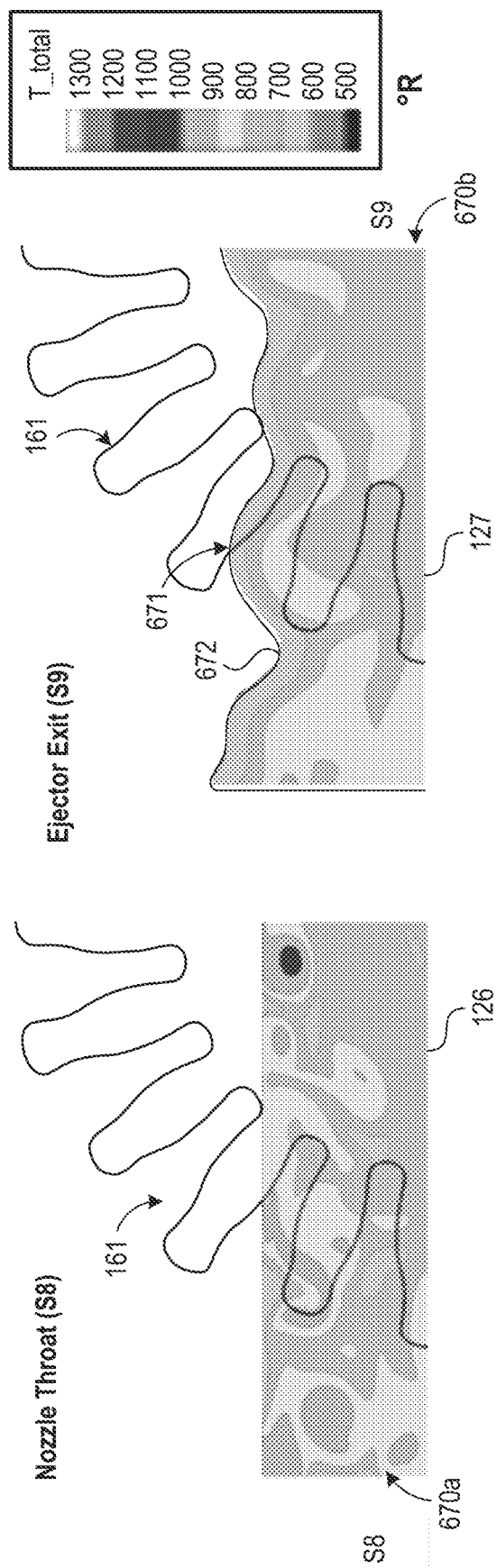

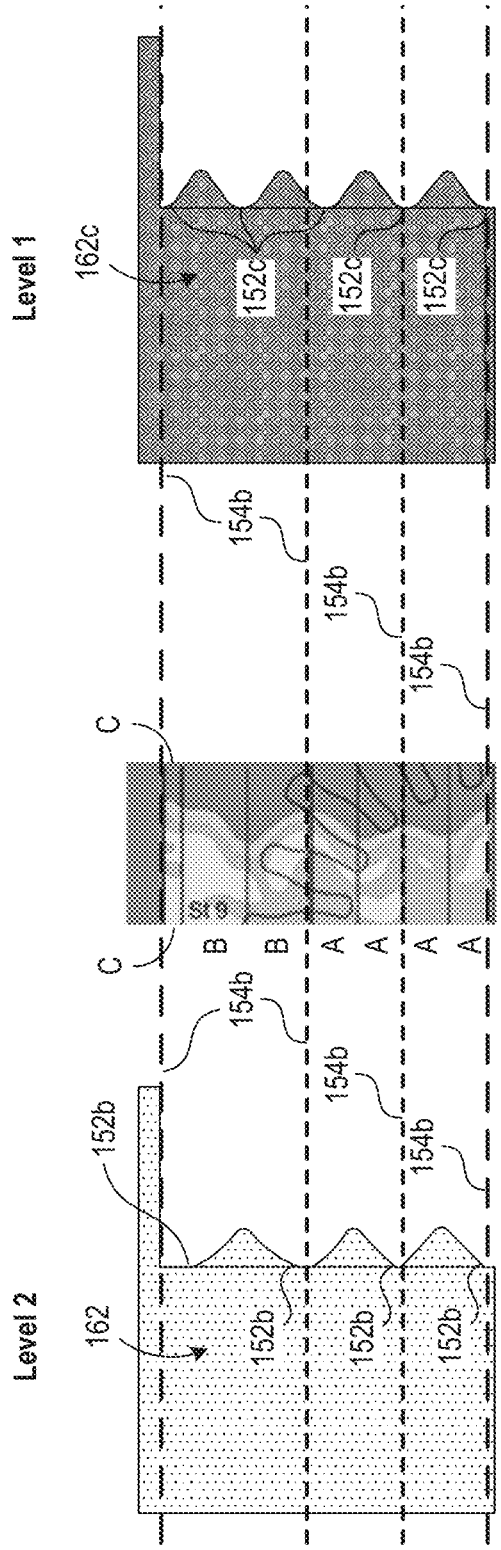

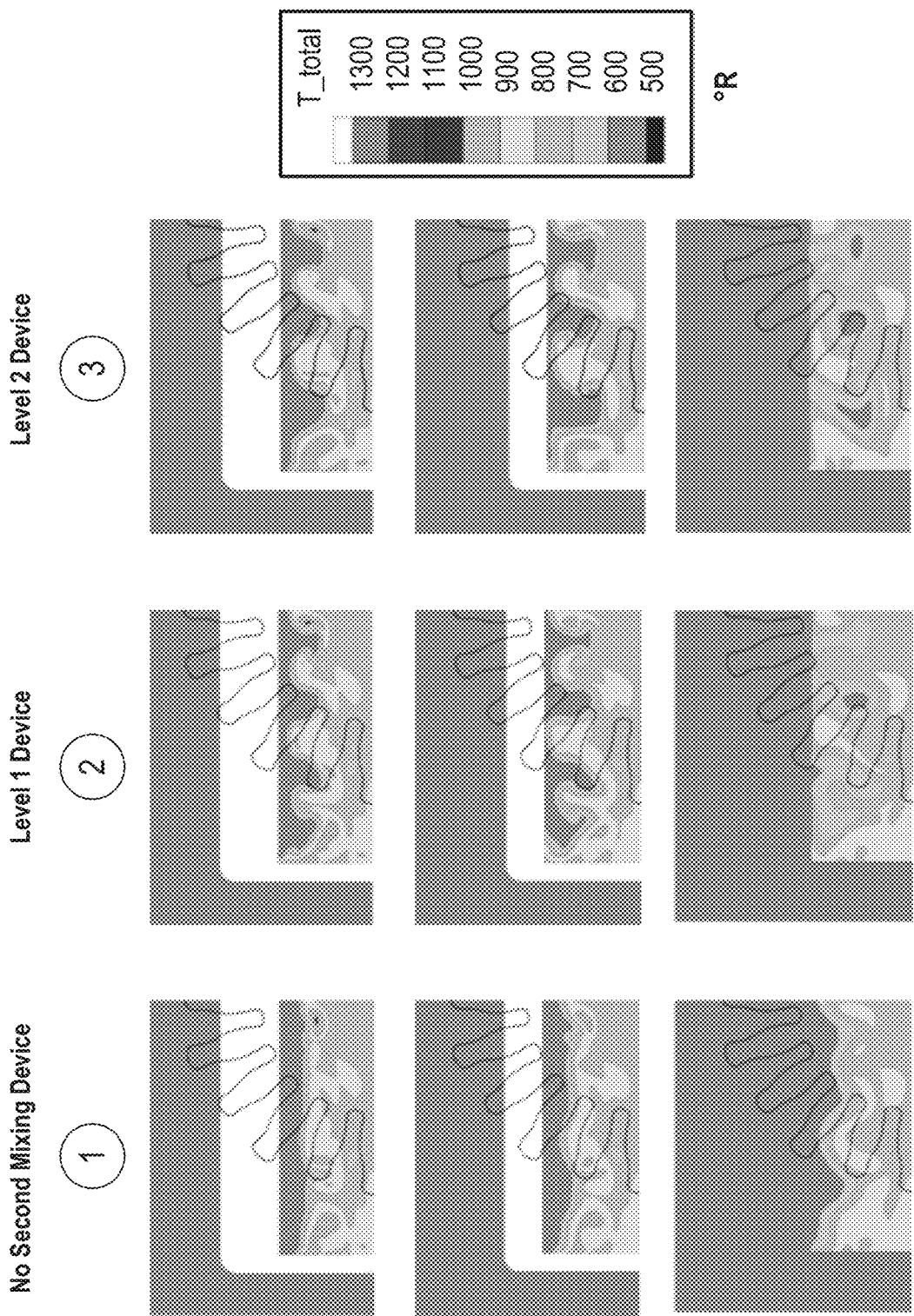
*FIG. 12A* X'/L = 0.25
*FIG. 12B* X'/L = 0.50
*FIG. 12C* X'/L = 1.00

| | Configuration | Takeoff Gross Thrust Coefficient, $C_{f,g}$ | % Change in Takeoff Gross Thrust Coefficient |
|---|---|---|---|
| 1 | No Sta 8 chevrons | 0.9636 | N/A |
| 2 | Sta 8 Uniform Chevrons (Level 1) | 0.9525 | -1.15% |
| 3 | Sta 8 Tailored Chevrons (Level 2) | 0.9532 | -1.08% |

*FIG. 13*

DISSIMILARLY SHAPED AIRCRAFT NOZZLES WITH TANDEM MIXING DEVICES, AND ASSOCIATED SYSTEMS AND METHODS

CROSS REFERENCE TO RELATED APPLICATION

The present application claims priority to U.S. Provisional Application 63/254,346, filed on Oct. 11, 2021 and incorporated herein by reference.

TECHNICAL FIELD

The present technology is directed generally to dissimilarly shaped aircraft nozzles, e.g., ejector nozzles, with tandem or axially spaced mixing devices, and associated systems and methods.

BACKGROUND

Supersonic aircraft have been used primarily for military missions since the mid-1950s. Then, in the 1970s, the United States and Europe each developed commercial supersonic aircraft: the supersonic transport, or "SST" in the United States, and the Concorde in Europe. The Concorde went on to fly commercial passengers on transatlantic routes through the 1990s. The fleet was permanently retired in 2003, following a temporary grounding in 2000 resulting from an accident. Despite the fact that the Concorde flew commercial passengers for several decades, it was not generally considered a commercially successful program because high operating costs did not make it broadly viable. Another drawback with the Concorde (and with supersonic aircraft generally) is the amount of noise they generate, especially at take-off, when they incur noise penalties. Accordingly, and in light of the Concorde's retirement, there remains a need in the industry for a viable and profitable supersonic commercial aircraft which can also satisfy the more stringent noise limits during take-off, and yet be thrust-efficient, particularly at cruise.

Both supersonic and subsonic aircraft take off at subsonic speeds, and at least some approaches to reduce jet noise applied to subsonic aircraft can also be applied to supersonic aircraft if the overall engine/nozzle architecture is similar. One method for reducing the noise produced by turbofan engines is to use long-ducted mixed-flow nozzles with lobe mixers and/or "chevrons" that mix the hot core flow and the relatively cooler fan flow inside the nozzle to achieve a more uniform flow near the nozzle exit. Chevrons are uniquely shaped projections, e.g., having the form of serrated edges at the nozzle lip. A similar approach can be used, in particular, with chevrons to mix the partially mixed engine flow with flow introduced to the nozzle via an ejector inlet duct and/or with the surrounding freestream air. The technology disclosed herein is directed to further enhancing the mixing between adjacent flows to decrease jet noise even further, e.g., at take-off, in particular, for nozzles that are designed to have an axial transition from one cross-sectional shape to another shape near their exit.

BRIEF DESCRIPTION OF THE DRAWINGS

FIGS. 6A and 6B are contour plots illustrating predicted flow total temperature levels at the nozzle throat, S8, and the ejector exit, S9, respectively, for a configuration similar to that shown in FIGS. 5A and 5B.

FIG. 8A is a duplicate of FIG. 7A, and is positioned between FIG. 8B (illustrating one representative positioning arrangement for second mixing device elements at S8), and FIG. 8C (illustrating another representative positioning arrangement for second mixing device elements at S8), in accordance with embodiments of the present technology.

FIGS. 12A-12C illustrate predicted total temperature contours at positions inside and along a nozzle ejector duct, for an ejector nozzle having a first mixing device and no second mixing device (Column 1), a Level 1 second mixing device (Column 2), and a Level 2 second mixing device (Column 3).

FIG. 13 is a table illustrating predicted take-off gross thrust coefficients for an ejector nozzle having a first mixing device and no second mixing device (Row 1), a Level 1 second mixing device (Row 2), and a Level 2 second mixing device (Row 3).

DETAILED DESCRIPTION

The present technology is directed generally to dissimilarly shaped aircraft nozzles with and without ejectors, with axially spaced-apart or tandem mixing devices. The nozzles can include ducts (e.g., "primary flowpaths") that transition axially from a first cross-sectional shape (e.g., a circular shape), to a second cross-sectional shape (e.g., a rectangular shape) that is geometrically non-similar or dissimilar to the first shape. In representative embodiments, a first mixing device is positioned at a location along the nozzle duct having the first shape, and a second mixing device is positioned downstream of the first mixing device, at a location where the nozzle duct has the second shape. In particular embodiments, the second mixing device is positioned to enhance mixing generated by the first mixing device whose mixing characteristics may not be immediately evident at the second location, but that instead appear, or are expected to appear, at a location further downstream from both the first and second mixing devices. This approach can be used to enhance mixing, and, hence, reduce jet noise, in a thrust-efficient manner, and in a way that accounts for changes in flow characteristics resulting from the nozzle duct transitioning from one shape at one nozzle station to a second, geometrically non-similar, shape at another nozzle station.

Specific details of several embodiments of the present technology are described below with reference to selected configurations to provide a thorough understanding of these embodiments, with the understanding that the technology may also be practiced in the context of other embodiments. Several details describing structures and/or processes that are well-known and often associated with other types of supersonic or subsonic aircraft propulsion systems, and/or associated systems and components, but that may unnecessarily obscure some of the significant aspects of the present disclosure, are not set forth in the following description for purposes of clarity. Moreover, although the following disclosure sets forth several embodiments of different aspects of the technology, several other embodiments of the technology can have configurations and/or components that differ from those described in this section. As such, the technology may have other embodiments with additional elements and/or without several of the elements described below with reference to FIGS. 1-14C.

Figure 1:
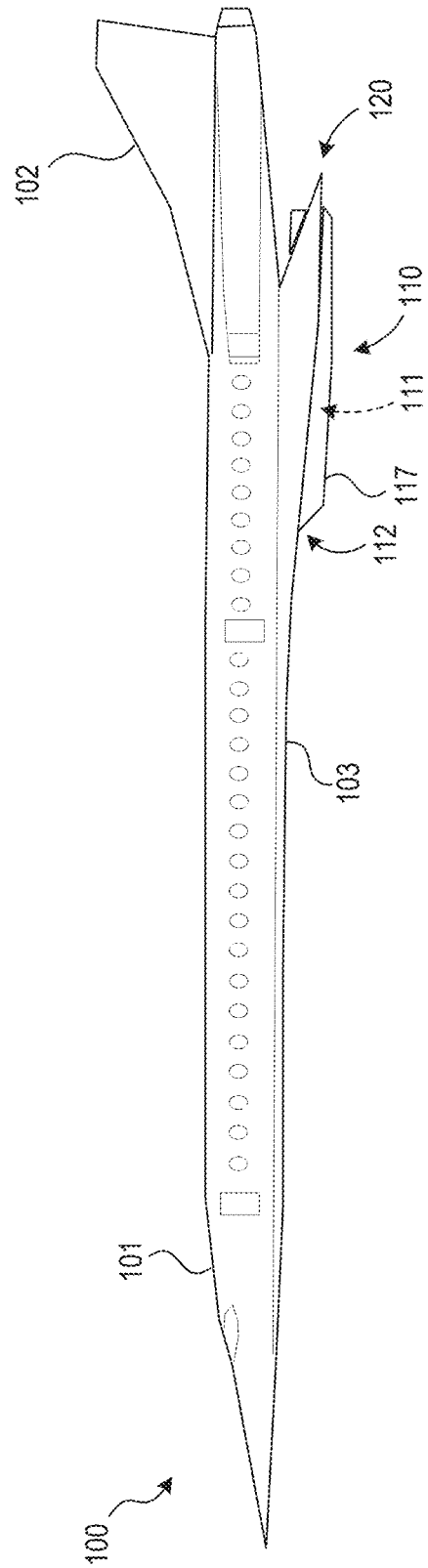
FIG. 1 is a partially schematic, side view illustration of an aircraft having a propulsion system configured in accordance with embodiments of the present technology.

FIG. 1 is a partially schematic, side view illustration of a representative supersonic aircraft 100 configured in accordance with embodiments of the present technology. The aircraft 100 can include a fuselage 101, wings 103, and a vertical stabilizer 102, along with other flight control surfaces not illustrated in FIG. 1 for purposes of simplicity. The aircraft 100 further includes a propulsion system 110, which in turn can include one or more nacelles 117, for example, one nacelle 117 carried by each wing 103. Each nacelle 117 includes an inlet 112, which provides air to an engine 111. A nozzle 120 directs engine core and bypass fan flow in an aft direction to provide thrust to the aircraft 100.

Figure 2A:
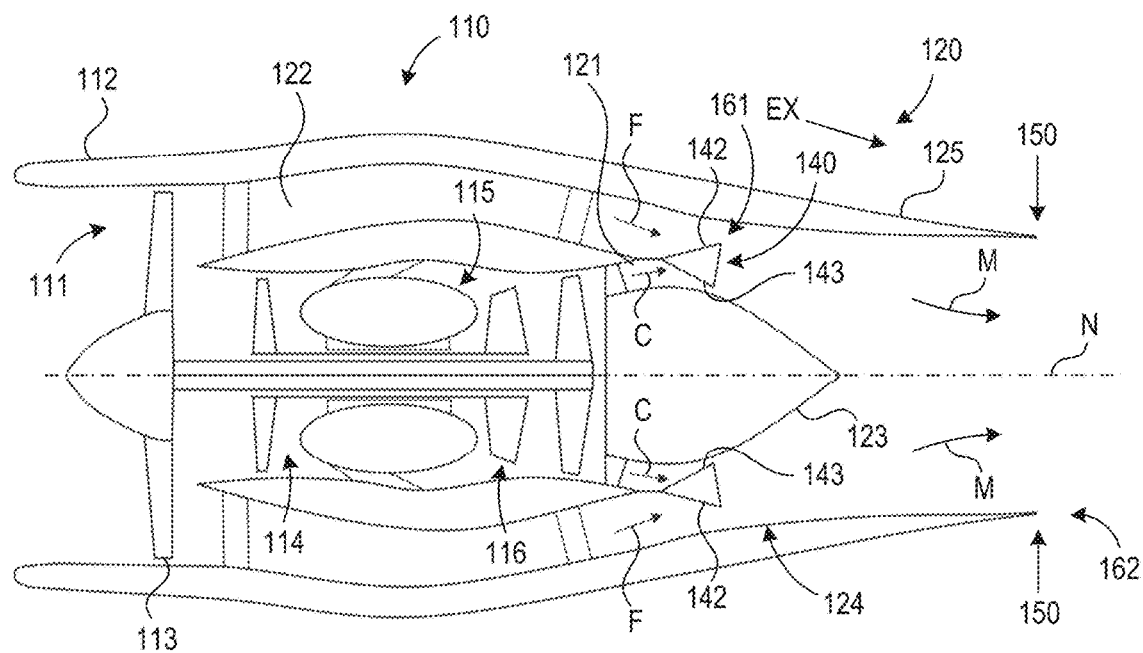
FIG. 2A is a partially schematic, cross-sectional side view illustration of a propulsion system having a first mixing device (e.g., a lobe mixer) and a second, downstream, mixing device (e.g., chevrons or other projections) according to the prior art.

FIG. 2A is a partially schematic and simplified, cross-sectional view of a representative propulsion system 110 with two mixing devices, 161 and 162, on a nozzle having a similar duct cross-sectional shape (circular) along its length, in accordance with the prior art. FIG. 2A illustrates the inlet 112, the engine 111, and the nozzle 120. The nozzle 120 includes a nozzle duct 124 having an outer wall 125 between the external airstream EX and the internal gas flow. The engine 111 includes a fan 113, a single- or multi-stage compressor 114, a combustor 115, and a single- or multi-stage turbine 116. The turbine 116 drives the compressor 114 and the fan 113. The fan 113 drives a bypass or fan flow F through a fan flow duct (or duct portion) 122 and around the core of the engine 111, while the exhaust products from the turbine 116 (e.g., a core flow C) are directed through a core flow duct (or duct portion) 121.

The propulsion system 110 further includes a first mixing device 161 that receives the core flow C and the fan flow F, and mixes the two flows to produce a mixed flow M which is directed aft around a center-cone 123 and out of the nozzle 120, generally along a nozzle axis N (e.g., a longitudinal axis). The first mixing device 161 can include a lobed mixer 140 having multiple lobes that are shaped, positioned, oriented, and/or sized to match the desired mass-flowrate from the engine 111 and improve the mixing between the relatively cool, low-speed fan flow F, and the relatively hot, high-speed core flow C. Accordingly, the lobed mixer 140 can include multiple core lobes 142 that direct a portion of the core flow from the core flow duct 121 radially outwardly to mix with the fan flow F. The lobes can further include multiple fan lobes 143 that direct a portion of the fan flow F radially inwardly to mix with the core flow C, e.g., with the core and the fan lobes sharing common sidewalls roughly in the radial direction.

To further enhance mixing (and therefore, jet noise suppression), the nozzle 120 can include a second mixing device 162. In the illustrated embodiment, the second mixing device 162 can include multiple projections 150, sometimes referred to herein as "chevrons." The projections 150, as well as techniques for positioning the projections (or other similar second mixing device elements) and/or selecting the number of projections is described further below.

Figure 2B:
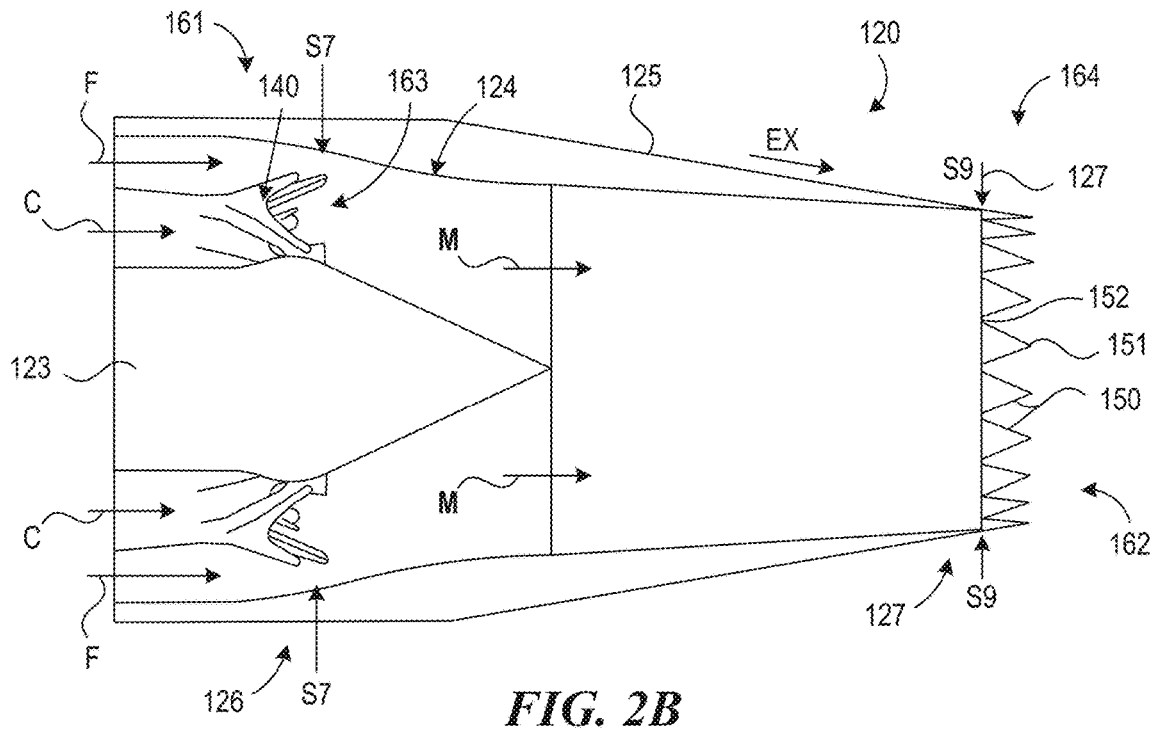
FIG. 2B is a partially schematic, partially cut-away illustration of the representative round nozzle having first and second mixing devices, illustrated in FIG. 2A.

FIG. 2B is a partially schematic, partially cross-sectional illustration of a representative round nozzle 120 generally similar to that shown in FIG. 2A, having a second mixing device 162 (e.g., a series of projections 150), at a round nozzle exit. As shown in FIG. 2B, the fan flow F and core flow C mix at the first mixing device 161, shown here as a lobe mixer 140 with some portion of the lobe sidewalls removed, or "scalloped." The mixed flow M proceeds to the nozzle exit or nozzle lip 127, sometimes referred to herein as station S9. The second mixing device 162, in the illustrated configuration, is positioned at the nozzle exit 127 to further mix the mixed flow M with the external freestream flow EX. When the second mixing device 162 includes projections 150, the projections can each include a tip 151, and a base or root 152. The open interstices or "valleys" between adjacent projections 150 facilitate mixing between the adjacent flows, which can increase axial vorticity and reduce turbulent kinetic energy (TKE) further downstream. This can in turn further reduce the noise produced by the nozzle 120 in certain frequency ranges at certain far-field angles, but may also increase it in other frequency ranges and far-field angles.

Figure 3:
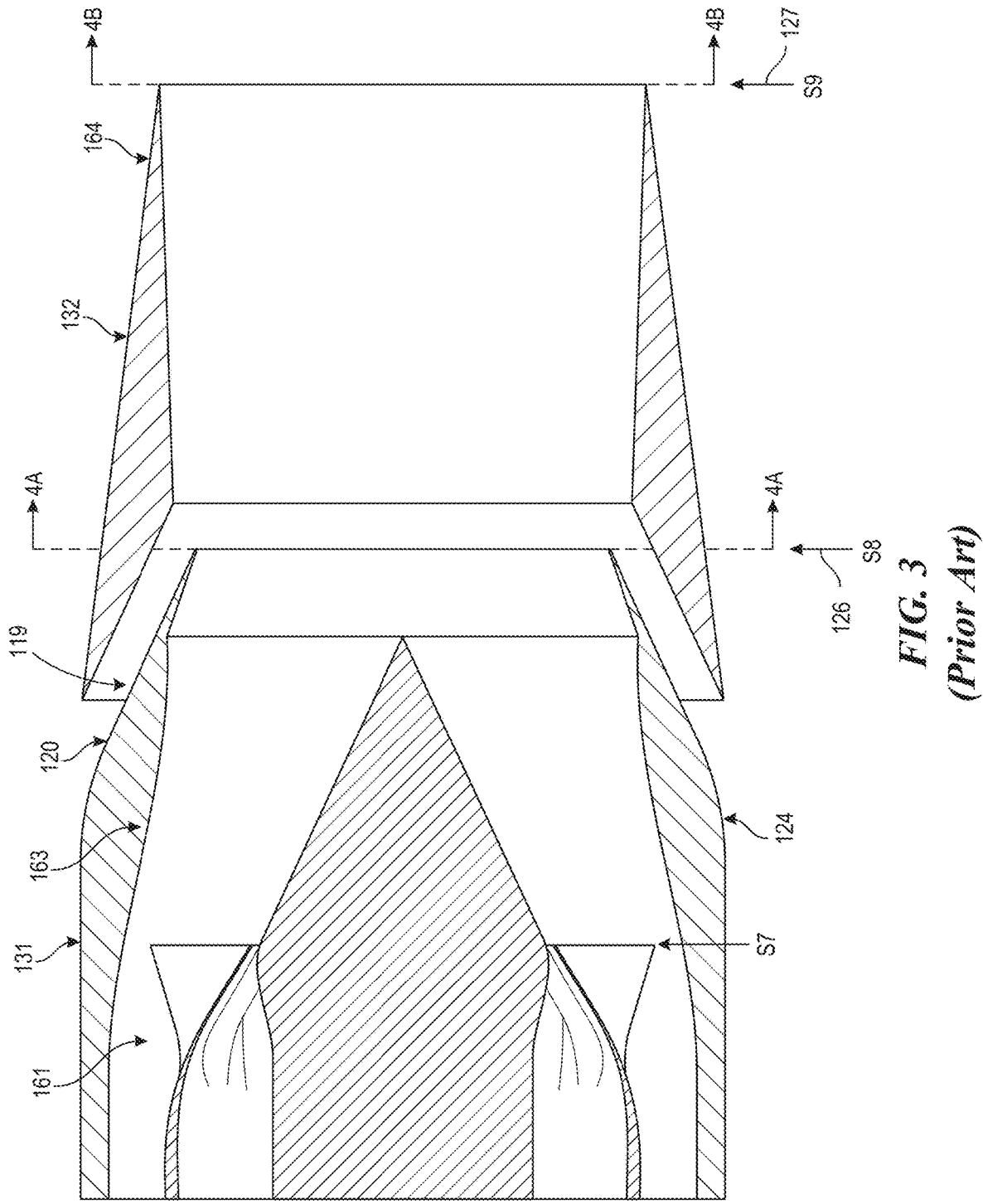
FIG. 3 is a partially-cross-sectional, partially cut-away illustration of a round ejector nozzle with a first mixing device (a lobe mixer), and no second mixing device, according to the prior art.

To understand how the flow in similarly shaped ejector nozzles can be well organized and relatively predictable, consider the round ejector nozzle configuration illustrated in FIG. 3. FIG. 3 illustrates an ejector nozzle assembly 120 having a first or upstream nozzle 131, which is round, and an ejector duct 132, generally aft of the nozzle 131, which is also round. Accordingly, both the nozzle 131 and the ejector duct 132 have the same or geometrically similar shapes. In the illustrated embodiment, the first or upstream nozzle 131 can include a converging portion of the nozzle duct 124, and the downstream ejector duct 132 can be diverging as is shown in this example, or converging, or neither. The ejector duct 132 is fed with ingested ambient flow EJ via an ejector inlet duct 119 in addition to the partially mixed engine stream. The first nozzle 131 has a first mixer 161, which is a lobe mixer in the illustrated embodiment, and a first cross-sectional shape 163 (which is round), at the throat 126 (or S8). The ejector duct 132 includes the ejector exit or lip 127, which as a second cross-sectional shape 164, is geometrically similar to the first cross-sectional shape 163, e.g., it is also round. No second mixer is shown in FIG. 3 at the nozzle throat S8. If the first and second shapes 163 and 164 respectively are geometrically similar, for example, if both shapes are round but have different diameters, then the flow behavior between the two stations, the throat S8 and the ejector exit S9, is relatively well-organized and predictable as described below.

Figures 4A, 4B:
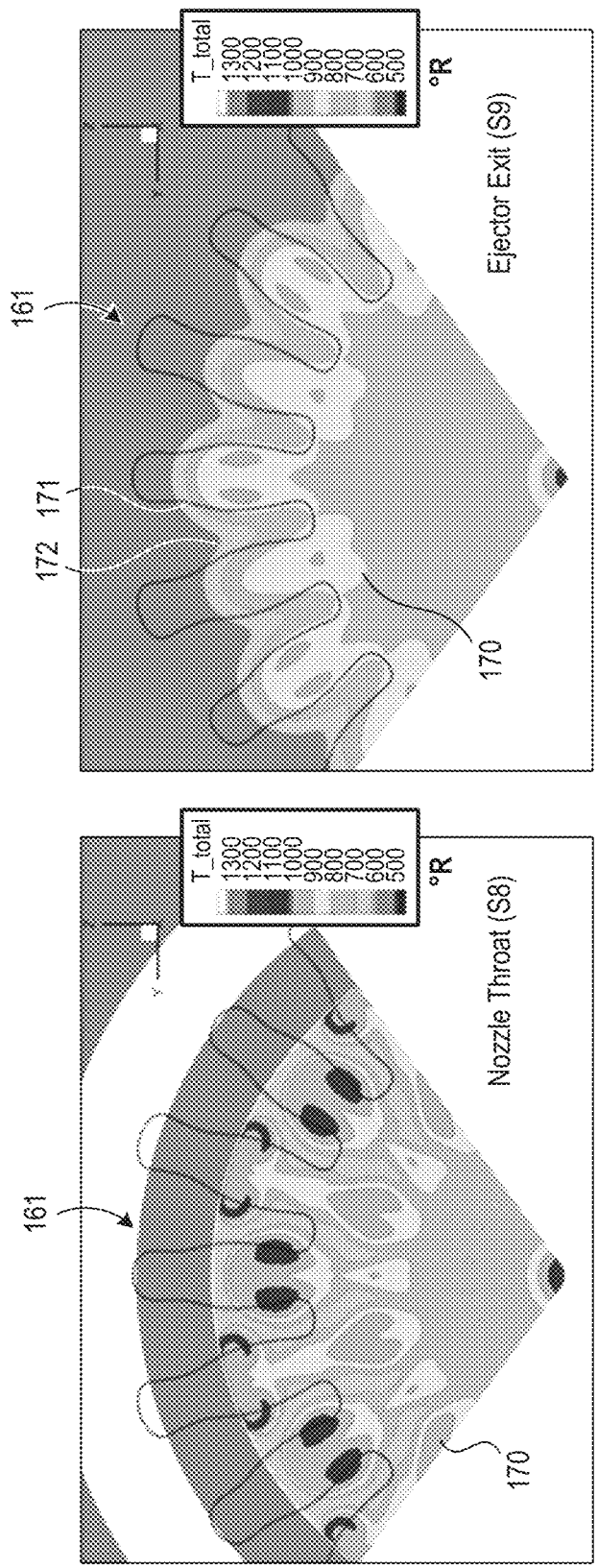
FIGS. 4A and 4B are contour plots illustrating predicted total temperature levels of the flow at the nozzle throat, S8, and the ejector exit, S9, respectively, of a round ejector nozzle of the type shown in FIG. 3.

FIG. 4A, for example, is a cross-sectional slice through the ejector nozzle duct similar to that shown in FIG. 3, at the nozzle throat 126, illustrating expected time-averaged (in particular, Reynolds-averaged) flow total temperature profiles or contours 170. These contour levels can also correspond to axial vorticity levels and/or other flow parameters suitable for predicting jet noise behavior. For hot jets, total temperature is a good marker to capture the flow interface between the hotter core flow and the cooler fan flow or the cooler ambient flow to illustrate enhanced mixing between these flows. Because the geometry of the nozzle 120 is generally axisymmetric, and the lobe mixer used in this simulation is azimuthally periodic, only one portion (slightly greater than a quadrant) of the nozzle cross-sectional slice is shown. The first mixing device 161 is also shown in FIG. 4A, although it is forward of the throat location 126, to illustrate the relative circumferential juxtaposition of the total temperature contours with the core and the fan lobes. FIG. 4B illustrates the flow total temperature profiles at the ejector exit 127 or S9 shown in FIG. 3.

Figure 5A:
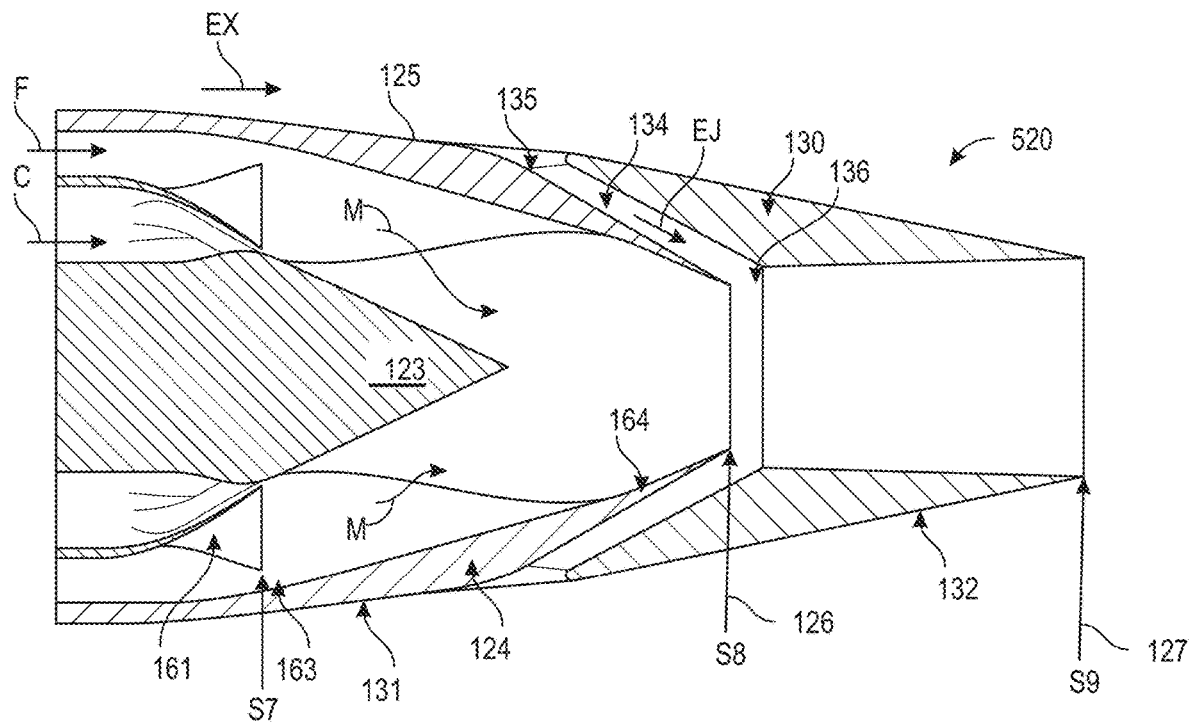
FIG. 5A is a partially schematic, partially cut-away illustration of an ejector nozzle having a two-dimensional rectangular ejector duct, with the nozzle axially transitioning from a round shape, near S7, to a rectangular shaped nozzle exit, near S8, in accordance with embodiments of the present technology.

As is evident from FIGS. 4A and 4B, the indicated flow characteristic (i.e., the total temperature) has a pattern that is well organized, periodic, and predictable between the first station (the nozzle throat 126) and the second station (the ejector exit 127) even though the flow passes through an ejector. For example, the total temperature contours of FIG. 4B include uniformly spaced peaks 171 that align with the upstream core lobes of the first mixing device 161 at station S7, and with corresponding, periodic, total temperature contours there. Uniformly spaced troughs 172 are positioned between the peaks 171. Due to this periodic organization of the flow in similarly shaped nozzles and ejectors, it is not difficult to select the second mixer (e.g., projections) at the nozzle throat 126, or the ejector exit 127, to enhance mixing. Conventional techniques include doing so based simply on the geometry of the first mixer, without the need to conduct any flow simulation of the type shown in FIGS. 4A and 4B, and is referred to as "clocking of the mixers." However, when the cross-sectional shape 163 of the upstream nozzle duct 131 changes in such a way that the downstream shape at 126, or S8, is geometrically non-similar to the upstream shape at S7, the flow characteristics can differ in ways that are not straightforward. FIG. 5A and the remaining figures below describe nozzle ducts with such axial shape transitions, and associated methodologies for enhancing gas flow mixing with a second mixer, despite the resulting non-straightforward flow characteristics. However, in both the conventional "clocking" technique for similar-shaped nozzles and the new technique described here for dissimilarly shaped ejector nozzles, it is assumed that there is no global mean swirl to the jet downstream of the second station, e.g., inside the ejector.

FIG. 5A is a partially schematic, partially cut-away illustration of an ejector nozzle 520 having a nozzle duct 124 that transitions from a first cross-sectional shape 163 (e.g., a generally circular shape) to a second, downstream cross-sectional shape 164 (e.g., a generally rectangular shape). In this embodiment, the transition takes place over a first portion 131 of the nozzle duct 124, e.g., between the first mixing device 161 and the nozzle throat 126. The second, downstream portion 132, which includes an ejector 130 having an ejector duct 132, can have the same general cross-sectional shape as that at the throat 126 (e.g., a generally rectangular shape) all the way to the ejector exit 127. The first mixing device 161 is positioned to mix the fan flow F with the core flow C. In this embodiment, the ejector nozzle 520 also includes an ejector inlet duct 134 that entrains external air EX into the ejector duct 132, and accordingly includes an entrance 135 at the outer wall 125 of the ejector nozzle 520, and an exit 136 proximate to the throat 126. The second mixing device (not shown in FIG. 5A) can be positioned at the throat 126 to (a) promote mixing between the mixed flow M and the ejector flow EJ, and/or (b) further enhance mixing initiated by the first mixing device 161 with the intent of reducing overall jet noise.

Figure 5B:
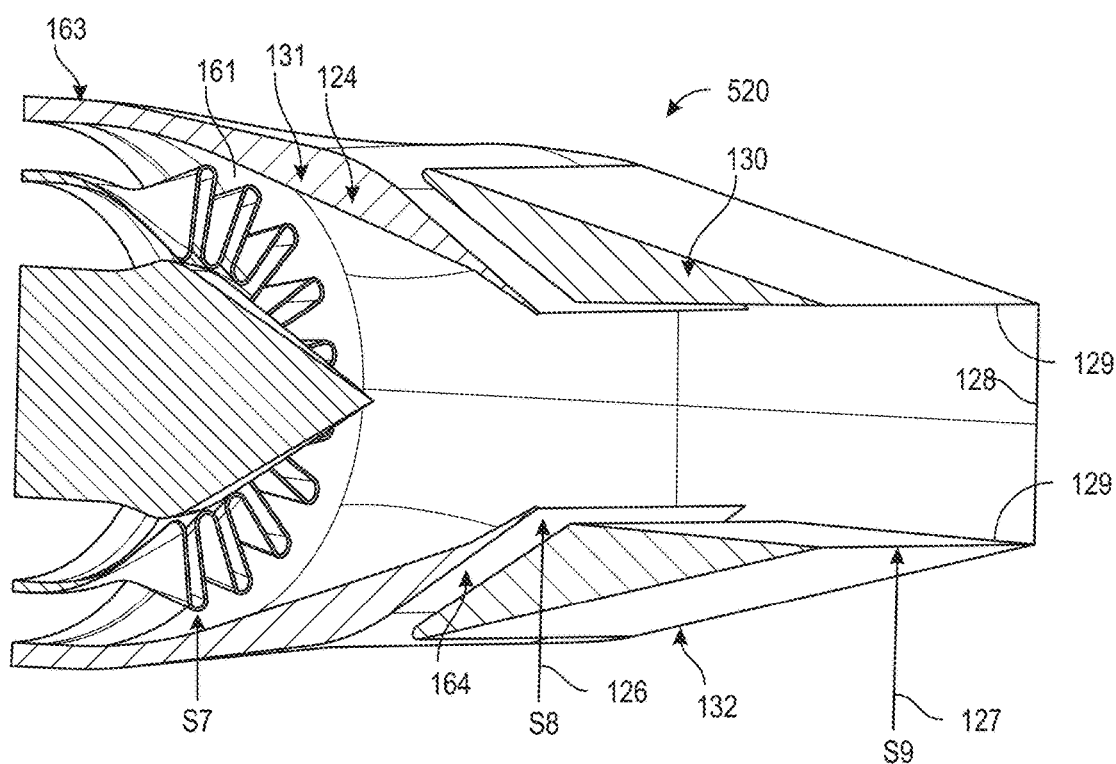
FIG. 5B is a partially schematic, partially cut-away isometric view of the nozzle duct shown in FIG. 5A.

FIG. 5B is a partially schematic, isometric illustration of the ejector nozzle 520 having an upstream nozzle 131 with a cross-sectional shape that transitions from round to rectangular, and an ejector 130 with a 2D-rectangular ejector duct 132, (shown partially cut-away in cross-section in FIG. 5A). FIG. 5B also illustrates the first mixing device 161 at S7, the nozzle throat 126 at S8, and the ejector exit 127 at S9. In a representative embodiment, the transition of the nozzle 131 from the first shape to the second shape is generally completed at or upstream of the nozzle throat 126, with the second shape continuing to the ejector exit 127. In FIG. 5B, the sidewalls 128 of the ejector duct 132 are shown to be flat and vertical, and the bottom and top flaps 129 of the ejector are also generally flat surfaces, thus the cross-section of the ejector duct 132 is generally a rectangle of changing size and aspect ratio (width-to-height ratio). In FIG. 5B, no second mixing device is illustrated. As described further below, predictive techniques (e.g., computational fluid dynamics or "CFD" techniques with Reynolds Averaged Navier Stokes (RANS) models) can be used to identify time-averaged flow characteristics at the ejector exit 127, which are in turn used to locate a second mixing device downstream of the first mixing device 161 near S8 or 126 in a manner that enhances overall mixing inside the ejector duct 132, as well as outside it. Alternatively, small-scale tests, instead of CFD tools, can be conducted on ejector nozzles, like that shown in FIG. 5B, without the second mixer at S8 or 126, to find the desired time-averaged flow characteristics at the ejector exit S9 or 127 which can aid in designing the second mixer with projections or chevrons at the nozzle throat S8 or 126.

FIGS. 6A and 6B illustrate first and second parameter contours 670a, 670b at the nozzle throat 126 (FIG. 6A) and the ejector exit 127 (FIG. 6B) of the ejector nozzle 520 shown in FIG. 5A or 5B for typical take-off engine cycle conditions. For purposes of illustration, and because the cross-section of the nozzle and the first mixing device 161 are symmetric relative to two orthogonal planes, one vertical and the other horizontal, only one quadrant of the nozzle cross-section is shown in FIGS. 6A and 6B. FIGS. 6A and 6B also illustrate the edge view of the first mixing device 161. In this illustration, the parameter contours represent time-averaged total temperature levels, which are correlated with mixing in a hot jet. In FIG. 6A, the first parameter contours 670a, representing the flow at the nozzle throat 126, do not show a flow pattern with any identifiable regularity or periodicity. Accordingly, while the conventional technique for designing and/or locating a second mixing device would have been to position projections or other flow mixer elements at the throat 126 based upon the flow patterns present there, no such information is evident from the predicted flow characteristics at the throat 126. This typically happens when the axial distance between the first mixer (at station S7) and station S8, (where the second mixer is to be located), is not large enough compared to the nozzle diameter at S7. However, as shown in FIG. 6B, the predicted second parameter contours 670b further downstream at the ejector exit 127 do show a more distinct or organized pattern that is actionable from a design perspective. In particular, the second parameter contours 670b exhibit peaks 671 and troughs 672. This has been found to be true for rectangular ejectors of different aspect ratios, too.

Figure 7A:
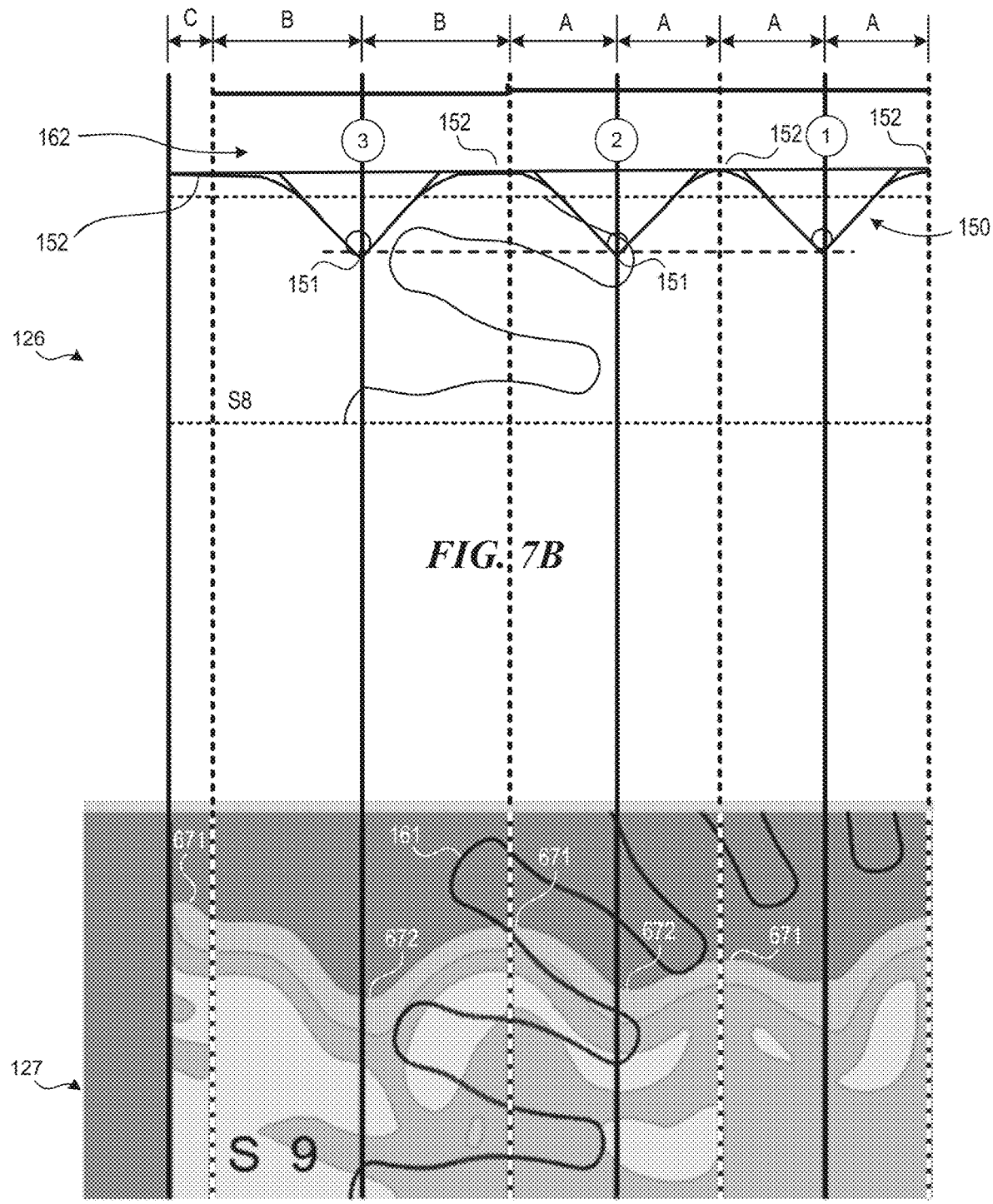
FIG. 7A is a duplicate of FIG. 6B, and is placed below FIG. 7B to illustrate a technique for positioning second mixing device elements at the nozzle throat, S8, based upon downstream ejector exit flow predictions at S9, in accordance with embodiments of the present technology.

FIGS. 7A and 7B illustrate a technique (sometimes referred to herein as "tailoring") for using the flow information obtained at the ejector exit 127 (S9) to position a second mixing device (including multiple mixing device elements) upstream of it at the nozzle throat 126 (S8). FIG. 7A is a duplicate of FIG. 6B, with the contour peaks 671 identified with dashed lines, and the contour troughs 672 identified with solid lines. FIG. 7B illustrates a forward-looking aft view from the throat 126 (S8), with a yet-to-be-designed second mixing device 162 superimposed. This second mixing device 162 includes projections 150, each having a tip 151 and a root or base 152. The first parameter to be decided during the design process of these projections, or chevrons, is generally the "number" of chevrons in the available width or span of the nozzle at that axial station 126. This reduces to deciding the width of each chevron at each spanwise location. Once the individual width and, hence, the total number of chevrons is decided, then the rest of its geometric parameters, e.g., its length or chord, its immersion angle, its curvature in the cross-sectional plane, the fillet radii at its root and tip, etc., can be decided using conventional techniques.

In order to enhance mixing, the interface area between the hot engine flow M and the cooler ambient flow EJ through the ejector inlet duct 134 (FIG. 5A) should be increased. First note that axial vorticity is formed in the interstitial spaces between the projections, with inwardly immersed chevrons (that is, immersed towards the nozzle center line N) generating axial vorticity, for example, in the clockwise direction from the left edge of the middle projection, shown near line 2 in FIG. 7B, and counterclockwise axial vorticity form the right edge of the projection to its left, near line 3 in FIG. 7B. Hence, to increase the interfacial area between the two flows, the space between two neighboring projections, or their roots, can be located at the peaks of the total temperature profiles observed at the downstream station 127. This pair of axial vortices pulls the hotter engine flow away from the nozzle line N and increases the interfacial area. The root locations 152 thus become the controlling feature for enhancing mixing, and are roughly aligned with the peaks 671 shown in FIG. 7A, as indicated by dashed lines. The tips 151 are roughly aligned with the troughs 672, as indicated by solid lines, labeled 1, 2, and 3. Accordingly, although the flow characteristic (total temperature) exhibits no regular pattern at the nozzle throat 126, it is expected that by positioning mixing device elements at or near the throat, but aligned with the downstream flow characteristics, the mixing downstream of the throat 126 will be enhanced—even though the evidence of such structures may not be easily detected at the throat 126. This is analogous to pinging a system at or near its natural frequency, so that an amplified system response is observed. Here, in a similar sense, the spanwise spacings between projections are designed to ping or excite the flow system by utilizing its naturally occurring spanwise spatial pattern downstream due to the upstream first mixer. this approach is expected to enhance the mixing occurring from station 126, where the projections are to be located, and more enhanced mixed flow should develop downstream of it with less loss than that obtained by spacing the projections arbitrarily.

As is also shown in FIG. 7B, the distances between neighboring tips 151 and roots 152 may not be equal across the width of the nozzle. For example, toward the right of FIG. 7B, adjacent tips 151 and roots 152 are separated by a distance A. Further outboard (toward the left of FIG. 7B), the adjacent tips and roots 151, 152 are separated by a greater distance B. At the far left outboard corner of the nozzle duct, the corresponding root 152 extends for an additional distance C. It is expected that, to obtain a more significant level of mixing, the projections 150 can be positioned in a manner that accounts for these different distances, i.e., the spacings between the projections 150 will not be the same for all projections. In other embodiments, as described further below with reference to FIGS. 8A-8C, an approximation technique may produce similar results, but with appropriately selected uniform spacing.

Figure 7C:
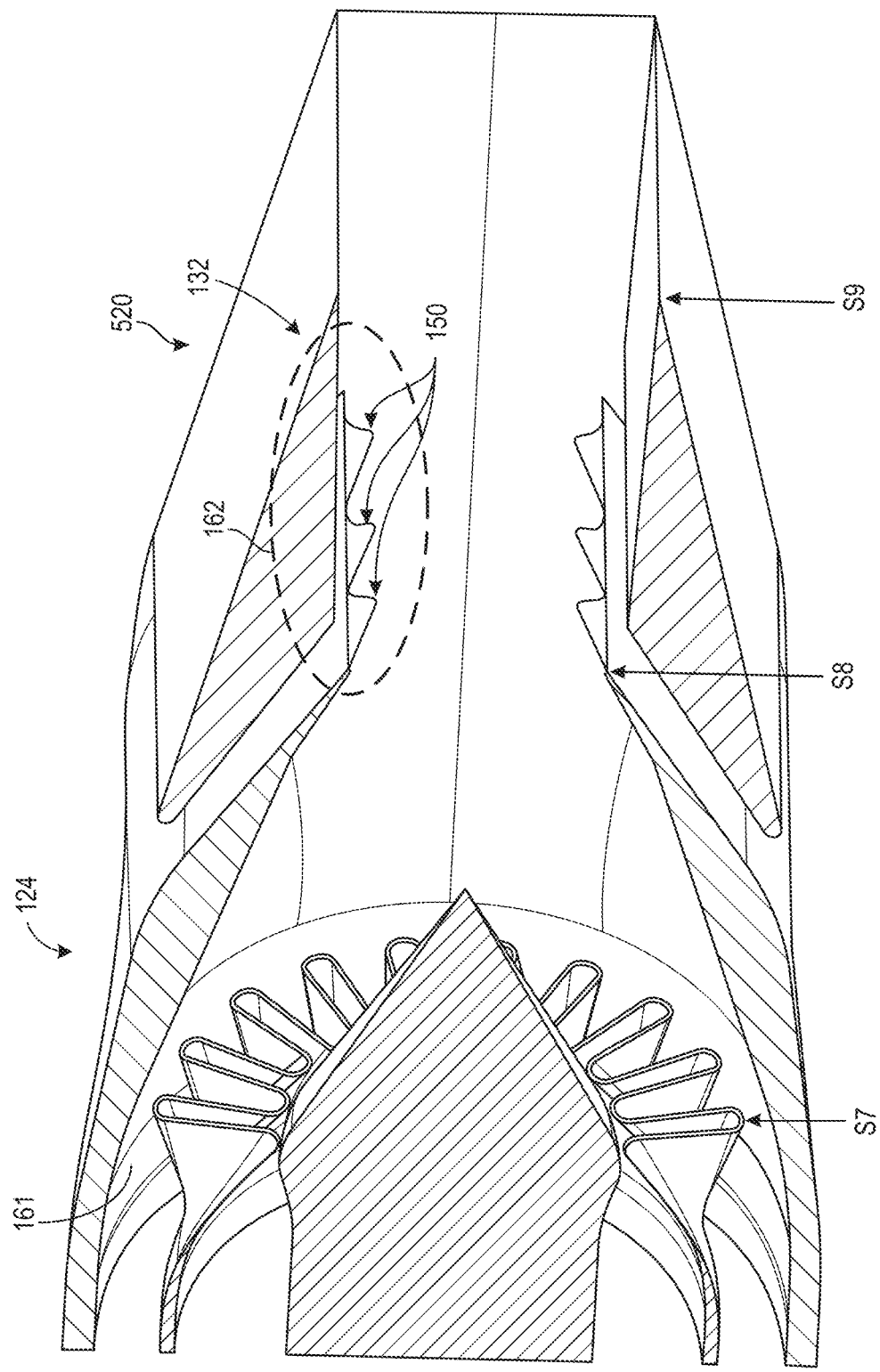
FIG. 7C is a partially schematic, partially cut-away isometric illustration of a representative nozzle having first and second mixing devices positioned in accordance with embodiments of the present technology.

FIG. 7C illustrates the nozzle 520 described above with reference to FIG. 5B, with the second mixing device 162 installed. The second mixing device is shown as being positioned at or generally at the junction between the nozzle duct 124 and the ejector duct 132. In the illustrated embodiment, the second mixing device 162 includes a set of multiple projections 150 positioned at the exit of the nozzle which is also its throat (S8). The projections 150 have non-uniform spacings between them, as shown in FIG. 7B. As described below, other possible spacings may also enhance mixing.

FIG. 8A is a duplicate of FIG. 7B, rotated 90°. FIGS. 8B and 8C illustrate two different techniques for "tailoring" or positioning the projections at the nozzle throat 126, based on the contour plot of FIG. 8A at the ejector exit 127. In particular, FIG. 8B illustrates a technique in which different projections have different spacings, so as to more precisely align with the features as described above with reference to FIG. 8A. FIG. 8C illustrates a technique in which the desired flow mixing result is obtained (or approximately obtained) by approximating the different spacings, shown in FIG. 8B, with an appropriately selected uniform spacing. The two techniques are referred to herein as Level 2 (more precise) and Level 1 (more approximate), respectively.

FIG. 8B illustrates the corresponding second mixing device 162 with projections positioned as per the Level 2 technique. Lines 154b are root alignment lines, indicating the alignment between the peaks in the total temperature contours of FIG. 8A, and the roots 152b of the second mixing device 162. As shown in FIG. 8B, the roots 152b do not have a consistent spacing, as described above.

FIG. 8C illustrates another second mixing device 162c, in which the roots 152c are uniformly spaced as per the Level 1 technique. As shown in this figure, the uniform spacing is selected such that several of the roots or valleys 152c still align with the corresponding root alignment lines 154b, but some do not. It is expected that this approach may approximate the flow mixing characteristics obtained with the Level 2 configuration shown in FIG. 8B, but may have other advantages, like being simpler to manufacture because the projections 150 are similar and evenly spaced. Analytical results supporting this prediction are described later.

Figure 9:
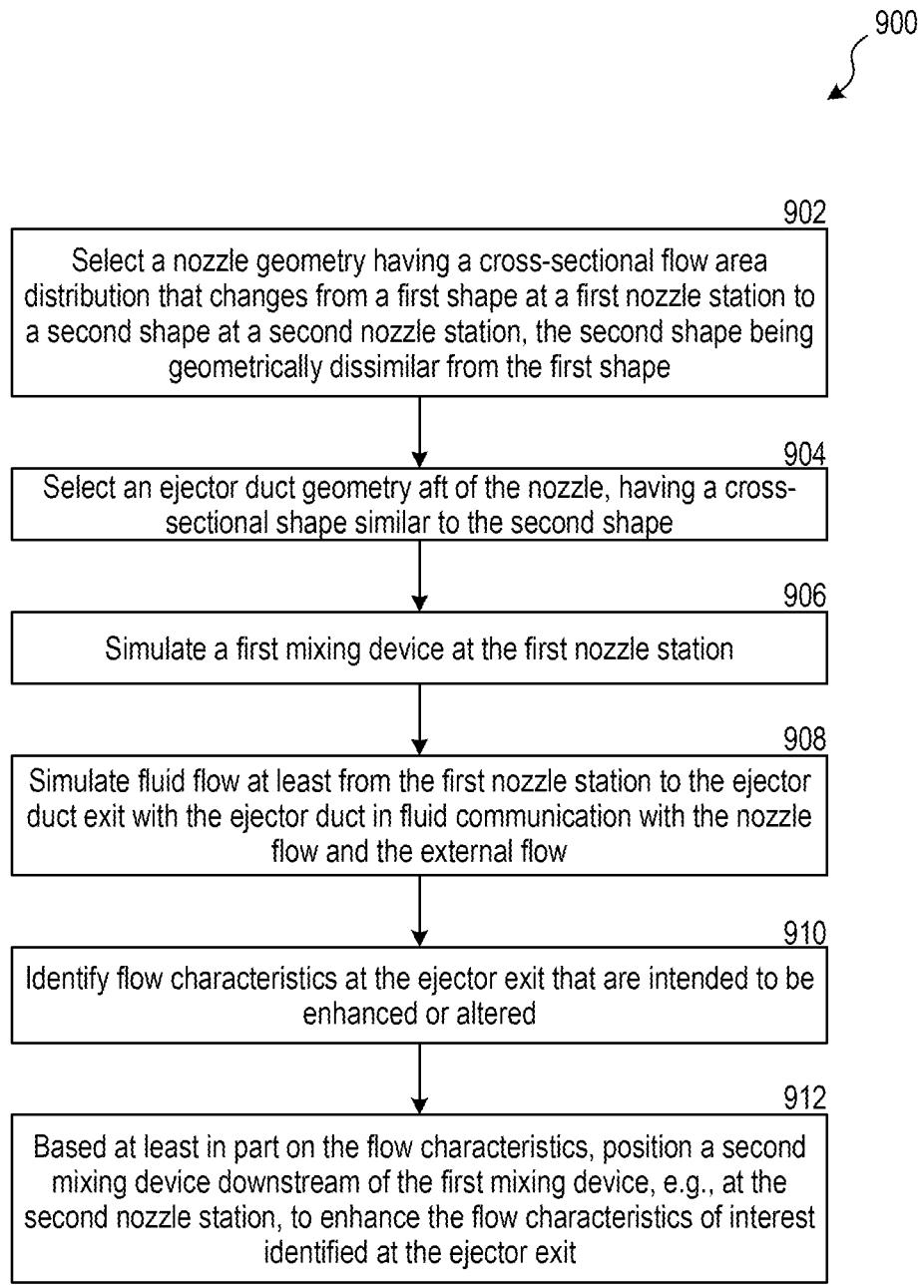
FIG. 9 is a flow diagram illustrating a process for positioning a second mixing device downstream from a first mixing device and upstream from a location at which predicted flow characteristics are identified, in accordance with embodiments of the present technology.

FIG. 9 is a flow diagram illustrating a process 900 for positioning mixing devices, and/or elements of mixing devices, in accordance with embodiments of the present technology. At blocks 902 and 904, the process includes selecting an ejector nozzle geometry having a cross-sectional shape distribution (e.g., the area defined by the inner perimeter of the duct containing the nozzle flow) that changes in an axial direction from a first shape at a first nozzle station (e.g., station S7) to a second shape at a second nozzle station (e.g., S8). Aft of the nozzle is an ejector duct having at least a portion that is geometrically similar to the inner cross-sectional shape of the nozzle—e.g., geometrically similar to the nozzle at the second nozzle station S8. For example, the first shape can be circular, and the second shape can be rectangular. In other embodiments, the first and second shapes can have other geometrically dissimilar characteristics, e.g., instead of the second shape being a rectangle, it can be an ellipse or a super-ellipse with different aspect ratio. As used herein, the terms "geometrically dissimilar" and "geometrically non-similar" refer to shapes that are not simply scaled uniformly relative to one another.

At block 906, the process includes simulating a first mixing device positioned proximate to the first nozzle axial station (e.g., station S7). The first mixing device is typically one that is designed specifically for a particular nozzle, but may include a pre-existing design. At block 908, the process includes simulating the fluid flow from the first station (e.g., S7) to the second station (e.g., S8) and downstream of it (e.g., to the ejector exit S9). Typically, the numerical simulation will not be limited to the region bounded by just the first station and the second station or the ejector exit, but will also include simulating the flow through the nozzle from a nozzle model inflow boundary upstream of S7 and all the way through and out of the ejector exit (S9 in FIG. 5A) into the external domain. In general, this simulation is to be done without any second mixing device. For example, conventional CFD techniques using RANS (Reynolds-Averaged Navier-Stokes) equations can be used to model a nozzle system having any of the first mixing devices described above, and the multiple flows that pass the mixing device to the nozzle exit S9 and to the external domain.

At block 910, one or more flow characteristics are identified at the ejector exit that indicate, for example, enhanced mixing which can reduce jet noise outside the nozzle. In several of the figures described above for a hot jet, the flow characteristic includes the time-averaged flow total temperature, but in other embodiments, the flow characteristics can include other suitable metrics, for example, turbulent kinetic energy or "TKE" or axial flow vorticity. At block 912, based at least in part on the flow characteristics of interest at the ejector exit, the process includes positioning a second mixing device downstream from the first mixing device, such as, at the nozzle exit, to enhance or alter in a desirable way the flow characteristics identified at the ejector exit. For example, block 912 can include positioning a series of projections at a nozzle station downstream of the first mixing device and upstream of, or even at, the ejector exit to enhance the mixing initiated by the first mixing device, and thus enhance or amplify the effect of the flow pattern or characteristic identified at the ejector exit, as explained above.

In at least some embodiments, one or more portions of the process described above with reference to FIG. 9 may be conducted iteratively. For example, after the second mixing device is selected and positioned, the simulation can be re-run with the second mixing device, and/or with a different first mixing device. The characteristics of one or both mixing devices can accordingly be selected and adjusted to produce an improved (e.g., optimal) combined or synergistic effect.

Figure 10:
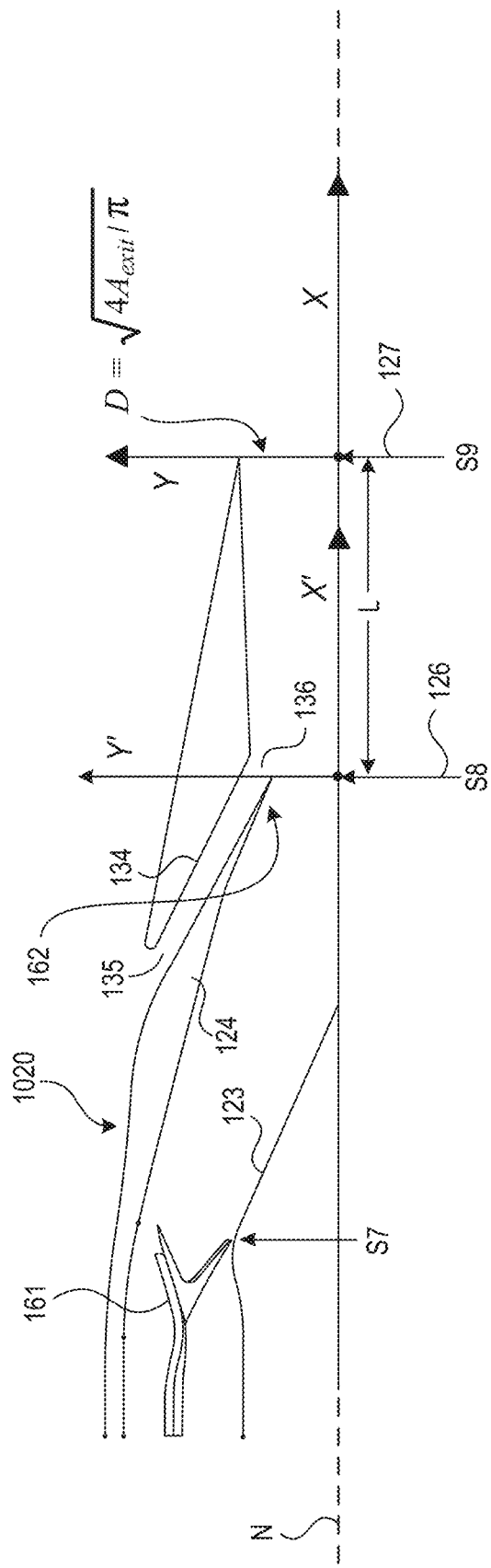
FIG. 10 is a partially schematic, cross-sectional illustration of a representative ejector nozzle geometry having a first mixing device at S7, and an ejector duct, along with coordinate systems used to identify the axial locations for contour plots shown in FIGS. 11A-12C.

FIG. 10 is a partially schematic, side cross-sectional illustration of a representative nozzle 1020, generally similar to that shown in FIG. 5A, having a first mixing device 161, an ejector inlet duct 134 with an entrance 135 and exit 136, and a second mixing device 162 positioned at the nozzle throat 126, near the ejector inlet duct exit 136. The nozzle duct 124 transitions from a generally circular shape at the first mixing device 161 to a generally rectangular shape just forward of the second mixing device 162. The second shape is generally maintained from the throat 126 to the ejector exit 127, although the size of the flow cross-sectional area may change between these two stations. In at least some instances, the shape (e.g., the cross-sectional aspect ratio) may also change, for example, if the ejector-nozzle duct includes variable area features, such as movable flaps or "turkey feathers."

FIG. 10 further illustrates two coordinate systems that are used in the following figures. One coordinate system (X', Y'), has the origin at S8 on the nozzle axis N, and includes the section of the ejector where the partially mixed engine flow M and the ingested ambient flow EJ mix inside the ejector nozzle duct. This section of the ejector duct is non-dimensionalized by axial length L, which is bounded by S8 (the throat 126) and S9 (the ejector exit 127), as in X'/L. A second coordinate system (X, Y) has its origin at the center of the ejector exit, S9 or 127. In this case, axial distances aft of the ejector exit 127 are measured as multiples of the diameter D, or non-dimensionalized as X/D. For the case of an ejector nozzle with a non-circular exit shape (at station S9), an equivalent diameter D may be calculated from the ejector exit area, $A_{exit}$, using the equation provided in FIG. 10.

FIGS. 11A-12C illustrate predicted flow characteristics for the nozzle geometry shown in FIG. 10. For each set of three figures (e.g., FIGS. 11A-11C, and 12A-12C), the flow characteristic is illustrated at three different axial positions, and for three different nozzle configurations: one configuration with no second mixing device, another configuration with mixing device elements positioned in accordance with the Level 1 technique (e.g., as described above with reference to FIG. 8C), and a third configuration in which the mixing device elements are positioned in accordance with the Level 2 technique, as described above with reference to FIG. 8B.

Figures 11A, 11B, 11C:
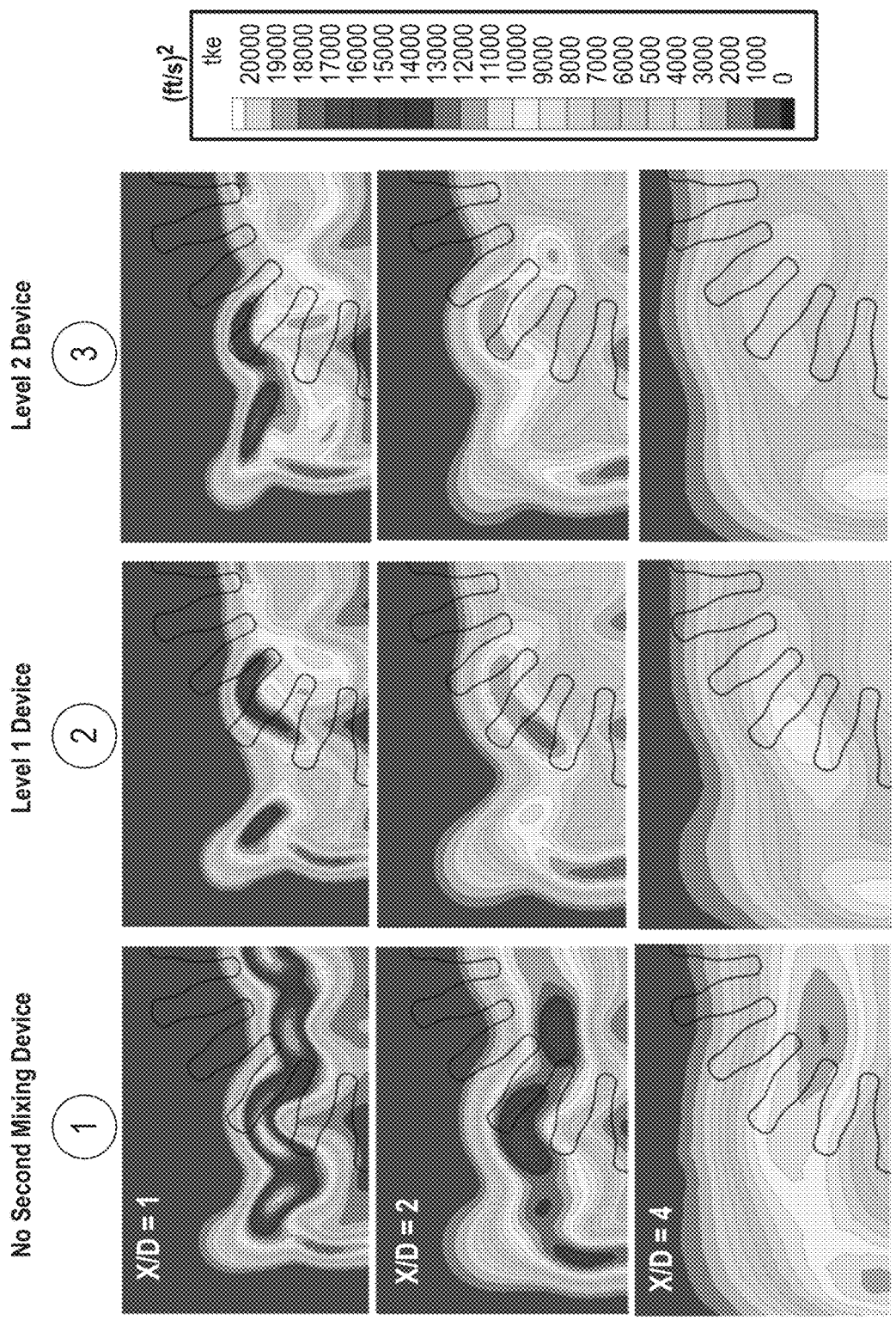
FIGS. 11A-11C illustrate predicted turbulent kinetic energy (TKE) contours at three positions downstream of the ejector exit, for an ejector nozzle having a first mixing device and no second mixing device (Column 1), a "Level 1" second mixing device (Column 2), and a "Level 2" second mixing device (Column 3).

FIGS. 11A-11C illustrate turbulent kinetic energy (TKE) contour levels for a nozzle having no second mixing device (Column 1), a Level 1 second mixing device (Column 2), and a Level 2 second mixing device (Column 3). FIG. 11A illustrates the flow characteristics at a distance X/D=1 aft of the ejector exit. FIG. 11B illustrates the characteristics at X/D=2, and FIG. 11C illustrates the characteristics at X/D=4. As shown in FIGS. 11A-11C, the Level 1 second mixing device (with constant projection spacing), as well as the Level 2 second mixing device (with non-uniform projection spacing) reduce TKE more than not having a second mixing device at all. The more precise projection positioning for the Level 2 second mixing device reduces TKE more than the Level 1 second mixing device further downstream at X/D=2 (FIG. 11B) and X/D=4 (FIG. 11C). It is noted that the further improvement is most evident in FIG. 11C which is at X/D=4, where it is expected to start improving the low-frequency noise suppression. Very close to the ejector exit (at X/D=1), the Level 2 second mixing device produces slightly higher turbulent kinetic energy (indicative of less noise suppression) than does the Level 1 device. This may result in a slight increase in high frequency noise due to the noise sources near the ejector exit from the Level 2 device; however, note from FIG. 11A that the volume having higher TKE for the Level 2 device is also smaller than that for Level 1 device, and it is expected that the overall effect is a perceived jet noise reduction for a Level 2 device, particularly, because low-frequency noise is generally the dominant part of the noise spectral-directivity characteristics, and the Level 2 device appears to strongly suppress the TKE associated with it further downstream. In any case, since the second mixing devices at both Level 1 and Level 2 show lower TKE, in general, than no second mixing device, they are generally expected to have lower overall jet noise than the latter in the far field.

FIGS. 12A-12C illustrate similar results, but measured internally in the ejector duct, between the nozzle throat S8, and the ejector exit S9. Accordingly, the X'-axis is non-dimensionalized by the ejector nozzle mixing section length L, rather than the nozzle exit diameter. FIGS. 12A-12C show time-averaged total temperature contour plots, respectively, at X'/L=0.25, 0.50 and 1.0 to capture the mixing effectiveness of the second level mixing devices. Note that both Level 1 and Level 2 devices show better mixing than no second mixing device (Column 1) due to the increase in the interfacial border and, hence, the interfacial area between the two flows which promotes turbulent mixing orthogonal to it. Also in this regard the Level 2 device appears to perform better than the Level 1 device, as the flow associated with it is more mixed at the ejector exit (FIG. 12C) than the flow associated with the Level 1 device.

FIG. 13 summarizes the results shown in FIGS. 11A-12C, in the form of gross thrust coefficient at take-off. In particular, FIG. 13 illustrates the gross take-off thrust coefficient for a configuration having no second mixing device at the throat (Row 1), a configuration having uniformly positioned projections in accordance with the Level 1 technique (Row 2), and a configuration having projections positioned at non-uniform spacings in accordance with the Level 2 technique (Row 3). As shown in FIG. 13, the Level 2 configuration reduces the gross take-off thrust coefficient, compared to No Sta 8 chevrons (Row 1), by an amount that is similar to, but a little less than, the reduction produced by the Level 1 configuration. Accordingly, it is expected that the Level 2 configuration will provide more jet noise suppression than the Level 1 configuration, as described earlier, without causing any larger thrust coefficient loss than the Level 1 configuration at take-off. While some thrust coefficient reduction at take-off is unavoidable, it is expected that this reduction will likely be offset by the improvement in jet noise suppression. This reduction at take-off may also be acceptable to aircraft operators since take-off is only a very small portion of the whole mission profile of the aircraft. The reduction in thrust coefficient can be mitigated by shielding or retracting the projections after take-off, as is described in co-pending U.S. patent application Ser. No. 17/955,900, titled "Retractable Chevrons for Aircraft Nozzles, and Associated Systems and Methods," and filed on Sep. 29, 2022.

Figure 14A:
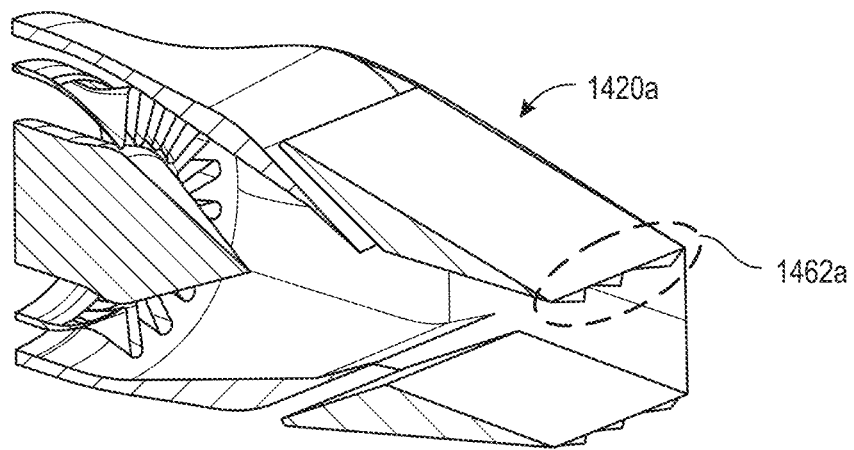
FIGS. 14A-14C illustrate nozzles with or without ejector ducts having non-similar cross-sectional shapes, in accordance with representative embodiments of the present technology.
Figure 14B:
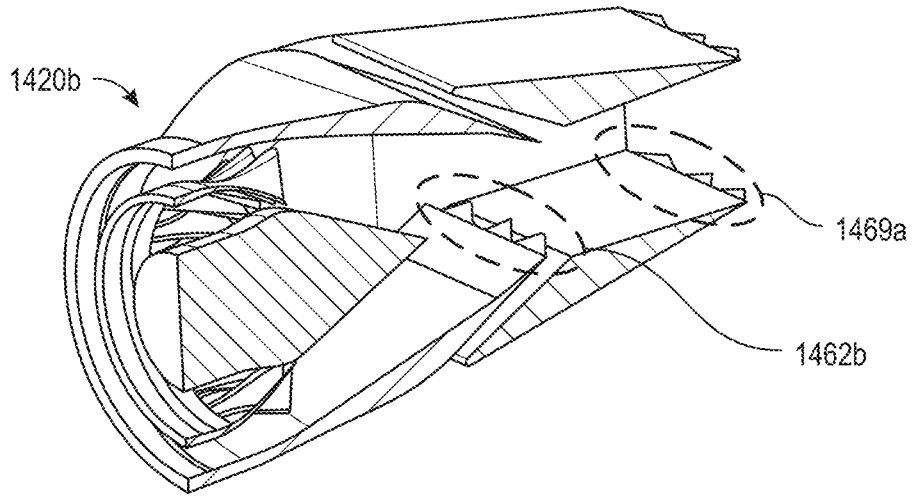
Figure 14C:
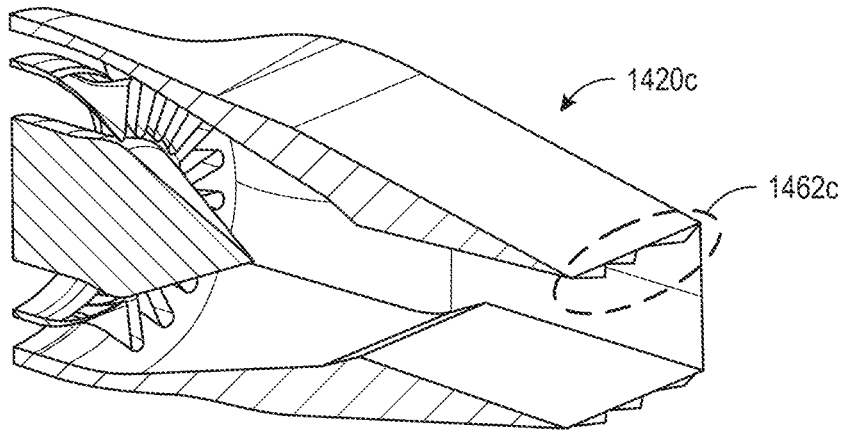

FIGS. 14A-14C schematically illustrate other configurations in which a second mixing device can be positioned to enhance flow mixing, with a reduced effect on take-off gross thrust coefficient, and by using techniques described herein. For example, FIG. 14A illustrates a representative rectangular ejector nozzle 1420$a$ having a second mixing device 1462$a$ of the Level 2 type, positioned at the ejector exit rather than the nozzle throat. FIG. 14B illustrates a rectangular ejector nozzle 1420$b$ having a second mixing device 1462$b$ and a third mixing device 1469$a$, both of the Level 2 type, one positioned at the nozzle throat, and another positioned at the ejector exit. FIG. 14C illustrates a nozzle 1420$c$ with a rectangular shape in the diverging section (bounded by the throat S8 and exit S9) that does not include an ejector duct, but does include the second mixing device 1462$c$ of Level 2 positioned at the nozzle exit; it assumes that its exit is sufficiently downstream of a round lobe mixer, such that the time-averaged flow characteristics of interest are reasonably organized at the nozzle exit, From the foregoing, it will be appreciated that specific embodiments of the disclosed technology have been described herein for purposes of illustration, but that various modifications may be made without deviating from the technology. For example, the mixing devices and/or nozzle duct cross-sectional shapes can be different than those specifically described herein. In particular, the second mixing device can include features other than projections to facilitate mixing. The second mixing device can mix two internal flows (e.g., a mixed core/fan flow with an ejector flow), and/or can mix an internal flow with an external flow. In some embodiments the design of the projections that comprise the second mixing device may also be tailored in a manner different than that described above—for example, at least one projection may be asymmetric in planform about its chord line from the tip to its base, or more generally have three-dimensional contouring, that is, have curvatures in both the chordwise direction and the spanwise direction. As discussed above, the spacings between the projections can be non-uniform, e.g., along a widthwise dimension of the nozzle duct an/or ejector duct. In other embodiments, the non-uniform spacing can be applied to other dimensions (e.g., the nozzle height), in addition to or in lieu of the width-wise dimension. Individual projections can be generally identical to each other, or projection characteristics, such as immersion, length, curvature, and/or other features, can vary from one projection to another. In some embodiments, the nozzles can include variable geometry features that produce thrust reversing, in addition to varying the nozzle area between take-off and cruise settings. For example, the two-dimensional ejector flaps can close down to produce reverse thrust.

Certain aspects of the technology described in the context of particular embodiments may be combined or eliminated in other embodiments. For example, the techniques described above with reference to FIG. 9 can be applied to any of the configurations shown in FIGS. 14A-14C, and throughout the application. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls. As used herein, the term "and/or," as in "A and/or B" refers to A alone, B alone and both A and B. As used herein, the terms "about" and "approximately" refer to values within 10% of the stated value.

The following examples provide additional representative features of the present technology.

1. An aircraft ejector nozzle, comprising:
   a nozzle duct having a nozzle flow axis, a first axial position and a second axial position, the nozzle duct having a first cross-sectional shape at the first axial position, and a second cross-sectional shape at the second axial position, the second shape being geometrically non-similar to the first shape;
   a fan flow duct portion upstream of the first axial position;
   a core flow duct portion positioned upstream of the first axial position;
   an ejector duct in fluid communication with the nozzle duct, and having at least one portion with a cross-sectional shape geometrically similar to the second cross-sectional shape;
   a first mixing device positioned proximate to the first axial position to mix fan flow in the fan flow duct portion with core flow in the core flow duct portion;
   a second mixing device positioned downstream of the first mixing device to mix the fan flow and the core flow with flow through the ejector duct, and direct the combined flow along the nozzle flow axis.
2. The aircraft ejector nozzle of example 1 wherein the first shape is circular and the second shape is rectangular.
3. The aircraft ejector nozzle of any of examples 1-2 wherein the second shape is rectangular, and wherein the second mixing device includes spaced-apart projections, and wherein the spacing between the projections across a width and/or a height of the rectangular second shape is not uniform.
4. The aircraft ejector nozzle of any of examples 1-2 wherein the second shape is rectangular, and wherein the second mixing device includes spaced-apart projections, and wherein the spacing between the projections across a width and/or a height of the rectangular second shape is uniform.
5. The aircraft ejector nozzle of any of examples 1-4 wherein the second axial position is at an exit of the nozzle duct.
6. The aircraft ejector nozzle of any of examples 1-5, further comprising a third mixing device positioned at an exit of the ejector duct.
7. An aircraft nozzle, comprising:
   a nozzle duct having a nozzle flow axis, a first axial position and second axial position, the nozzle duct having a first cross-sectional shape at the first axial position, and a second cross-sectional shape at the second axial position, the second shape being geometrically non-similar to the first shape;
   a fan flow duct portion upstream of the first axial position;
   a core flow duct portion positioned upstream of the first axial position;
   a first mixing device positioned proximate to the first axial position to mix fan flow in the fan flow duct portion with core flow in the core flow duct portion;
   a second mixing device positioned downstream of the first mixing device to mix the fan flow and the core flow with an additional flow, and direct the combined flow along the nozzle flow axis.
8. The aircraft nozzle of example 7 wherein the second mixing device includes spaced-apart projections.
9. A method for configuring an aircraft ejector nozzle, comprising:
   selecting a nozzle geometry having a cross-sectional shape distribution that changes from a first shape at a first nozzle station to a second shape at a second nozzle station, the second shape being geometrically dissimilar from the first shape;
   selecting an ejector duct geometry having an ejector duct exit aft of the second nozzle station, with at least a portion of the ejector duct geometry having a cross-sectional shape similar to the second shape of the nozzle at the second nozzle station;
   simulating a first mixing device positioned proximate to the first station;
   simulating a nozzle flow from the first station to the ejector duct exit, with the ejector duct in fluid communication with the nozzle and an external flow;
   identifying a flow characteristic at the ejector duct exit; and
   based at least in part on the flow characteristic at the ejector duct exit, selecting a position for a second mixing device downstream from the first mixing device to enhance the flow characteristic identified at the ejector exit.
10. The method of example 9 wherein the first shape is circular and the second shape is rectangular.
11. The method of any of examples 9-10 wherein the second nozzle station is at an exit of the nozzle.
12. The method of any of examples 9-11 wherein the second mixing device is positioned at a throat of the nozzle duct.
13. The method of any of examples 9-12, further comprising: selecting the second mixing device to include a plurality of spaced-apart projections.
14. The method of example 13, further comprising:
    aligning a tip of at least one of the projections with a trough in a spanwise distribution of the time-averaged total temperature at the ejector exit.
15. The method of any of examples 13-14, further comprising:
    aligning a root of at least one of the projections with a peak in a spanwise distribution of the time-averaged total temperature at the ejector exit.
16. The method of any of examples 13-15 wherein the second shape of the nozzle is rectangular, and wherein a spacing between projections across a width and/or a height of the rectangular second shape is not uniform.
17. The method of any of examples 13-15 wherein the second shape of the nozzle is rectangular, and wherein a spacing between projections across a width and/or a height of the rectangular second shape is uniform.
18. The method of any of examples 9-17, further comprising, after selecting the position for the second mixing device:
    simulating the second mixing device;
    simulating an updated nozzle flow from the first station to the ejector exit, with the second mixing device simulated
    identifying an updated flow characteristic at the ejector exit; and
    changing a characteristic of the second mixing device based at least in part on the updated flow characteristic.

19. The method of any of examples 9-18 wherein the flow characteristic includes time-averaged total temperature.
20. The method of any of examples 9-19 wherein the flow characteristic includes turbulent kinetic energy.

We claim:

1. A method for configuring an aircraft ejector nozzle assembly including a nozzle and an ejector duct, the method comprising:
    selecting a nozzle geometry of the nozzle, the nozzle geometry having a cross-sectional shape distribution that changes from a first shape at a first nozzle station to a second shape at a second nozzle station, the second shape being geometrically dissimilar from the first shape;
    selecting an ejector duct geometry of the ejector duct, the ejector duct having an ejector duct exit aft of the second nozzle station, with at least a portion of the ejector duct geometry having a cross-sectional shape similar to the second shape of the nozzle at the second nozzle station;
    simulating a first mixing device positioned proximate to the first station;
    simulating a nozzle assembly flow from the first station to the ejector duct exit, with the ejector duct in fluid communication with the nozzle and an external flow;
    identifying a flow characteristic at the ejector duct exit, wherein the flow characteristic is at least one of total temperature, turbulent kinetic energy, or axial flow vorticity;
    based at least in part on the flow characteristic in the simulation at the ejector duct exit, selecting a position for a second mixing device downstream from the first mixing device to enhance the flow characteristic at the ejector duct exit; and
    positioning the second mixing device at the selected position downstream from the first mixing device.

2. The method of claim 1 wherein the first shape is circular and the second shape is rectangular.

3. The method of claim 1 wherein the second nozzle station is at an exit of the nozzle.

4. The method of claim 1 wherein the second mixing device is positioned at a throat of the nozzle-duct.

5. The method of claim 1, further comprising:
    selecting the second mixing device to include a plurality of spaced-apart projections.

6. The method of claim 5, further comprising:
    aligning a tip of at least one of the projections with a trough in a spanwise distribution of a time-averaged total temperature at the ejector duct exit.

7. The method of claim 5, further comprising:
    aligning a root of at least one of the projections with a peak in a spanwise distribution of a time-averaged total temperature at the ejector duct exit.

8. The method of claim 5 wherein the second shape of the nozzle is rectangular, and wherein a spacing between projections across a width and/or a height of the rectangular second shape is not uniform.

9. The method of claim 5 wherein the second shape of the nozzle is rectangular, and wherein a spacing between projections across a width and/or a height of the rectangular second shape is uniform.

10. The method of claim 1, further comprising, after selecting the position for the second mixing device:
    simulating the second mixing device;
    simulating an updated nozzle assembly flow from the first station to the ejector duct exit, with the second mixing device simulated;
    identifying an updated flow characteristic at the ejector duct exit; and
    changing a characteristic of the second mixing device based at least in part on the updated flow characteristic.

11. A method for configuring an aircraft ejector nozzle assembly including a nozzle and an ejector duct, the method comprising:
    selecting a nozzle geometry of the nozzle, the nozzle geometry having a cross-sectional shape distribution that changes from a first shape at a first nozzle station to a second shape at a second nozzle station, the second shape being geometrically dissimilar from the first shape;
    selecting an ejector duct geometry of the ejector duct, the ejector duct having an ejector duct exit aft of the second nozzle station, with at least a portion of the ejector duct geometry having a cross-sectional shape similar to the second shape of the nozzle at the second nozzle station;
    simulating a first mixing device positioned proximate to the first station;
    simulating a nozzle assembly flow from the first station to the ejector duct exit, with the ejector duct in fluid communication with the nozzle and an external flow;
    identifying a flow characteristic at the ejector duct exit;
    based at least in part on the flow characteristic at the ejector duct exit, selecting a position for a second mixing device downstream from the first mixing device to enhance the flow characteristic at the ejector exit;
    selecting the second mixing device to include a plurality of spaced-apart projections;
    positioning the second mixing device at the selected position downstream from the first mixing device; and
    aligning a tip of at least one of the projections with a trough in a spanwise distribution of a time-averaged total temperature at the ejector duct exit.

12. A method for configuring an aircraft ejector nozzle assembly including a nozzle and an ejector duct, the method comprising:
    selecting a nozzle geometry of the nozzle, the nozzle geometry having a cross-sectional shape distribution that changes from a first shape at a first nozzle station to a second shape at a second nozzle station, the second shape being geometrically dissimilar from the first shape;
    selecting an ejector duct geometry of the ejector duct, the ejector duct having an ejector duct exit aft of the second nozzle station, with at least a portion of the ejector duct geometry having a cross-sectional shape similar to the second shape of the nozzle at the second nozzle station;
    simulating a first mixing device positioned proximate to the first station;
    simulating a nozzle assembly flow from the first station to the ejector duct exit, with the ejector duct in fluid communication with the nozzle and an external flow;
    identifying a flow characteristic at the ejector duct exit;
    based at least in part on the flow characteristic at the ejector duct exit, selecting a position for a second mixing device downstream from the first mixing device to enhance the flow characteristic at the ejector duct exit;
    selecting the second mixing device to include a plurality of spaced-apart projections;
    positioning the second mixing device at the selected position downstream from the first mixing device; and aligning a root of at least one of the projections with a peak in a spanwise distribution of a time-averaged total temperature at the ejector duct exit.

* * * * *

UNITED STATES PATENT AND TRADEMARK OFFICE
CERTIFICATE OF CORRECTION

PATENT NO. : 12,162,618 B2
APPLICATION NO. : 17/962994
DATED : December 10, 2024
INVENTOR(S) : Vinod G. Mengle et al.

Page 1 of 1

It is certified that error appears in the above-identified patent and that said Letters Patent is hereby corrected as shown below:

In the Claims

In Column 15, Line 42, in Claim 4, delete "nozzle-duet." and insert -- nozzle. --.

Signed and Sealed this
Twelfth Day of August, 2025

Coke Morgan Stewart
*Acting Director of the United States Patent and Trademark Office*